United States Patent [19]
Keegan et al.

[11] Patent Number: 5,857,141
[45] Date of Patent: Jan. 5, 1999

[54] METAL-CORE WELD WIRE FOR WELDING GALVANIZED STEELS

[75] Inventors: James M. Keegan, Troy; Sundaram Nagarajan, Fairborn; Roger A. Daemen, Troy; Joseph Bundy, Piqua, all of Ohio

[73] Assignee: Illinois Tool Works Inc., Glenview, Ill.

[21] Appl. No.: 661,390

[22] Filed: Jun. 11, 1996

(Under 37 CFR 1.47)

[51] Int. Cl.$^6$ .............................. B23K 9/23; B23K 35/362
[52] U.S. Cl. ............................ 428/560; 75/302; 148/24; 148/26; 219/145.1; 219/145.22; 219/146.23; 219/146.41
[58] Field of Search ........................... 219/145.1, 145.22, 219/146.23, 146.41; 428/560; 148/24, 26; 75/302

[56] References Cited

U.S. PATENT DOCUMENTS

| | | |
|---|---|---|
| 3,584,187 | 6/1971 | Majetich et al. . |
| 3,656,943 | 4/1972 | Heuschkel . |
| 3,860,777 | 1/1975 | Sawhill ............... 219/146.22 |
| 4,005,309 | 1/1977 | Zvanut et al. ............ 219/146.22 |
| 4,345,140 | 8/1982 | Godai et al. . |
| 4,593,174 | 6/1986 | Saito et al. . |
| 4,950,331 | 8/1990 | Pokhodnya et al. . |
| 4,999,479 | 3/1991 | Paton et al. . |
| 5,099,103 | 3/1992 | Yamada et al. . |
| 5,118,919 | 6/1992 | Chai et al. ............... 219/146.22 |
| 5,120,931 | 6/1992 | Kotecki et al. . |
| 5,124,529 | 6/1992 | Nishikawa et al. . |
| 5,132,514 | 7/1992 | Chai et al. . |
| 5,192,851 | 3/1993 | James et al. . |
| 5,225,661 | 7/1993 | Chai et al. . |
| 5,233,160 | 8/1993 | Gordish et al. . |
| 5,300,754 | 4/1994 | Gonzalez et al. . |
| 5,313,039 | 5/1994 | Harvey et al. . |
| 5,365,036 | 11/1994 | Crockett et al. . |

FOREIGN PATENT DOCUMENTS

| | | |
|---|---|---|
| 76-038289 | 10/1976 | Japan . |
| 76038289 | 10/1976 | Japan . |
| 53-026221 | 3/1978 | Japan . |
| 53026221 | 3/1978 | Japan . |
| 53-144438 | 12/1978 | Japan . |
| 53144438 | 12/1978 | Japan . |
| 55-008326 | 1/1980 | Japan . |
| 55008326 | 1/1980 | Japan . |
| 0180976 | 2/1985 | Japan . |
| 6121432 | 4/1988 | Japan . |
| 0046988 | 11/1988 | Japan . |
| 0893833 | 2/1990 | Japan . |
| Hei 8-66792 | 3/1996 | Japan . |
| 858854 | 1/1956 | United Kingdom . |
| 1510120 | 5/1978 | United Kingdom . |

*Primary Examiner*—Margery Phipps
*Attorney, Agent, or Firm*—Mark W. Croll

[57] ABSTRACT

A metal-core weld wire usable for gas shielded arc welding gapless joints on low carbon and low alloy galvanized and galvanealed steels. The metal-core weld wire includes a low carbon steel sheath surrounding a core composition. In one embodiment, the low carbon steel sheath includes, by total weight of the metal-core weld wire, between approximately 0.01–0.03% C, and the core composition includes, by total weight of the metal-core weld wire, between approximately 0.05–0.20% Ti, between approximately 0.05–1.00% Nb, Fe powder, and Mn to the extent that the metal-core weld wire includes between approximately 0.1–1.0% Mn wherein the metal-core weld wire includes between approximately 0.1–1.0% Si. The core composition is, by total weight of the metal-core weld wire, between approximately 0.001–12.0%. The metal-core weld wire provides, at weld rates up to 150 cm/min, reduced arc ionization potential and spatter, and improved arc stability and shielding. The metal-core weld wire produces, at weld rates up to 150 cm/min, weld deposits having reduced blow holes and porosity, no liquid metal embrittlement, and reduced weld pool surface tension resulting in an improved wetting characteristic.

17 Claims, 1 Drawing Sheet

METAL-CORE WELD WIRE FOR WELDING GALVANIZED STEELS

BACKGROUND OF THE INVENTION

The invention relates generally to metal-cored weld wires, and more specifically to metal-core weld wires usable for gas shielded arc welding low carbon and low alloy galvanized and galvannealed steels at relatively high weld rates to produce improved weld deposits on overlapping or butted workpieces with no gap therebetween.

In many gas shielded arc welding applications, low carbon and low alloy galvanized and galvannealed steels are welded in single pass, high weld rate operations that require weld deposits on gapless joints with minimum hot cracking, minimum blow hole formation and substantially no porosity, minimum slag formation and spatter, good wetting characteristic and corrosion resistance, no liquid metal embrittlement, improved impact strength, and a minimum tensile strength of approximately 85,000 psi.

Galvanized steels are formed by coating or depositing zinc on steel in a hot dipping, or a sherardizing, or an electroplating process. The galvanized metal is sometimes annealed to form a galvannealed metal with improved properties including reduced flaking of the coating, which tends to occur during metal forming operations. When welding galvanized and galvannealed metals, however, there is a tendency for zinc vapor to enter into the molten weld pool, which results in a defective weld deposit. More specifically, zinc coating vaporized from the surface of the metal tends to create turbulence in the shielding gas thereby introducing atmospheric nitrogen and oxygen into the weld pool resulting in nitrogen and oxygen contamination of the weld deposit and increased spatter. In addition, zinc vapor is not readily soluble in molten steel, and any vapor that does not escape from the molten weld pool before solidification results in the formation of blow holes and pores in the weld deposit. Blow hole and pore formation are particularly severe when welding joints without a gap between the workpieces since there is limited area for vapor to escape from the molten weld pool.

Galvanized metals are known for improved corrosion resistance, and are used increasingly in the automotive industry for automobile frames, bumpers, axles, cradle assemblies, fenders, and water heaters among other components, which often require welding gapless joints. These metals are generally low carbon and low alloy steels having good press forming characteristics. In some applications, industry uses low carbon and low alloy galvannealed steels with a thickness ranging between approximately 0.030 and 0.250 inches and a coating weight of approximately 45 gm/m$^2$. The relatively thin gauge steels often must be welded in a single pass at high weld rates to prevent the welding arc from burning through the metal. Assembly line operations also require single pass, high weld rates to improve productivity. Weld rates up to approximately 150 cm/min are sometimes required. At high weld rates, however, the molten weld pool tends to cool relatively rapidly thereby reducing the time for vapor to escape from the weld pool, which increases the formation of blow holes and porosity in the weld deposit. The rapidly cooled weld deposit formed in high weld rates applications tends also to result in a poor weld deposit contour, or wetting characteristic. High weld rates are also a source of turbulence in the shielding gas, which tends to increase the addition of atmospheric nitrogen and oxygen into the weld pool as discussed above.

Presently, galvanized steels are welded with self shielded weld wires containing magnesium and barium. The magnesium displaces nitrogen and oxygen to reduce porosity. But the magnesium also reacts with the zinc coating to cause liquid metal embrittlement, which is unacceptable in many industrial applications. These self shielded wires also produce excessive smoke, which is undesirable, and moreover produce excessive spatter and slag, which must be removed before applying coatings over the weld deposit. Slag formation tends also to prevent vapor from escaping from the molten weld pool resulting in increased blow holes and porosity, which are further increased when welding gapless joints. In addition, barium is considered toxic and creates an unacceptable health hazard.

JP Patent Application No. 61-21432 discusses a solid weld wire for gas shielded arc welding galvanized steels. Solid wires, however, have undesirable deep "finger" penetration and reduced productivity in comparison to metal-core wires. In addition, the solid weld wire of JP Patent Application No. 61-21432 has a relatively high carbon content, which may reduce ductility and increase hot cracking sensitivity and spatter. This solid weld wire also has a relatively high titanium content, which increases slag formation, and includes aluminum, which increases spatter and provides a poor wetting characteristic. The solid weld wire of JP Patent Application No. 61-21432 therefore tends to be expensive and is not suitable for welding at high weld rates.

JP Patent Application No. 1989-3833 discusses a solid weld wire for gas shielded arc welding galvanized steels at high weld rates. JP Patent Application No. 1989-3833, however, teaches that it is undesirable to add aluminum, titanium, silicon and other deoxidizing agents to the solid weld wire because deoxidizing agents allegedly increase the activity of zinc in the molten weld pool resulting in blow hole formation. The solid weld wire of the JP Patent Application No. 1989-3833 also produces slag resulting possibly from the substantial elimination of deoxidizing agents from the weld wire. The solid weld wire of the JP Patent Application No. 1989-3833 includes niobium and vanadium to reduce blow hole and pore formation in cases where gas shielding effectiveness is reduced. The amounts of niobium and vanadium disclosed in JP Patent Application No. 1989-3833, however, result in increased hot cracking and have an adverse affect on ductility. In addition, this solid wire has increased strength and hardenability that results in increased loads on wire drawing dies during manufacture of the weld wire increasing production costs.

In view of the discussion above, there exists a demonstrated need for an advancement in the art of metal-core weld wires.

It is therefore an object of the invention to provide a novel metal-core weld wire that overcomes problems with the prior art.

It is also an object of the invention to provide a novel metal-core weld wire usable for gas shielded arc welding low carbon and low alloy galvanized and galvanealed steels at relatively high weld rates to produce improved weld deposits on joints with no gap therebetween.

It is another object of the invention to provide a novel a metal-core weld wire usable for gas shielded arc welding relatively thin gauge low alloy and low carbon galvanized and galvanealed steel at relatively high weld rates.

It is another object of the invention to provide a novel a metal-core weld wire usable for gas shielded arc welding low alloy and low carbon galvanized and galvanealed steels at weld rates up to 150 cm/min wherein the weld deposit has reduced blow hole and pore formation, no liquid metal embrittlement or hot cracking, improved weld deposit wetting characteristic, improved impact strength and ductility, and improved corrosion resistance, at relatively high weld deposit rates.

It is yet another object of the invention to provide a novel metal-core weld wire usable for gas shielded arc welding low alloy and low carbon galvanized and galvanealed steels wherein the metal-core weld wire produces reduced arc ionization potential, reduced spatter, and improved shielding at relatively high weld deposit rates.

Accordingly, the invention is drawn to a metal-core weld wire usable for gas shielded arc welding low carbon and low alloy galvanized and galvanealed steels. The metal-core weld wire includes a low carbon steel sheath surrounding a core composition. In one embodiment, the low carbon steel sheath includes, by total weight of the metal-core weld wire, between approximately 0.01–0.03% C, and the core composition includes, by total weight of the metal-core weld wire, between approximately 0.05–0.20% Ti and between approximately 0.05–1.00% Nb, wherein the metal-core weld wire includes between approximately 0.40–0.50% Si. In one embodiment, the core composition includes Mn to the extent that the metal-core weld wire includes between approximately 0.1–1.0% Mn, and iron powder. The core composition may also include, by total weight of the metal-core weld wire, between approximately 0.02–1.00% Cu, and in another embodiment between approximately 0.05–0.80% V. The core composition is, by total weight of the metal-core weld wire, between approximately 0.001–12.0%, and in an alternative embodiment between approximately 5.0 and 7.0%. The weld wire provides, at weld rates up to 150 cm/min, reduced arc ionization potential and spatter, and improved arc stability and shielding. The weld wire produces, at weld rates up to 150 cm/min, weld deposits having reduced blow holes and porosity, no liquid metal embrittlement, improved corrosion resistance and ductility, and reduced weld pool surface tension resulting in an improved wetting characteristic when welding gapless joints.

These and other objects, features and advantages of the present invention will become more fully apparent upon consideration of the following Detailed Description of the Invention with the accompanying drawings, which may be disproportionate for ease of understanding, wherein like structure and steps are referenced by corresponding numerals and indicators.

DETAILED DESCRIPTION OF THE INVENTION

Figure 1:
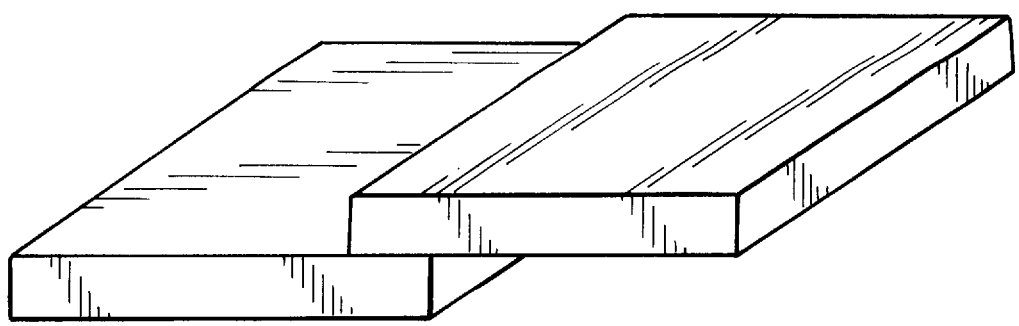
FIG. 1 is a perspective view of a lap joint having substantially no gap between overlapping plates.

The invention is drawn to a novel metal-core weld wire, or tubular welding electrode, comprising a low carbon steel sheath having a tubular core filled with a core composition. The core composition is between approximately 0.001–12.0% total weight of the metal-core weld wire. The low carbon steel sheath includes minimum amounts of carbon to minimize hot cracking and spatter. In the present metal-core weld wire, a carbon content greater than 0.06% has been found to have a tendency towards hot cracking of the weld deposit as further discussed below. In one embodiment, the low carbon steel sheath includes, by total weight of the metal-core weld wire, between approximately 0.01–0.10% C, and in another embodiment between approximately 0.01–0.03% C.

In one embodiment, the core composition includes niobium alone or in combination with vanadium to prevent blow hole and pore formation. It is expected that tantalum will have the same beneficial affect as niobium on the prevention of blow holes and pore formation when welding galvannealed steels. The niobium and vanadium also reduce surface tension in the weld pool resulting in an improved wetting characteristic, or wet out, of the molten weld pool and therefore provide an improved weld deposit contour, which permits increased weld deposit rates. In addition, niobium and vanadium increase the hardenability of the weld deposit, which is necessary for increasing weld deposit strength. In one embodiment, the core composition includes, by total weight of the metal-core weld wire, between approximately 0.05–1.00% Nb, and in another embodiment, between approximately 0.30–0.40% Nb. In the present metal-core weld wire, a niobium amount greater than 0.73% has been found to increase the tendency towards hot cracking. In an alternative embodiment, the core composition includes between approximately 0.05–0.80% V, and in another embodiment between 0.05–0.20% V. Increased amounts of vanadium tend to increase hot cracking and decrease ductility of the weld deposit.

The core composition may also include titanium alone or in combination with the niobium, or vanadium, or both to prevent blow hole and pore formation. Titanium is a denitrifying agent that combines with nitrogen introduced into the weld pool and reduces porosity. Titanium tends also to reduce surface tension in the weld pool permitting increased weld deposit rates as discussed above with respect to niobium and vanadium. Additionally, titanium has a low ionization energy so that titanium tends to stabilize the welding arc. A more stable welding arc provides a more stable shielding gas envelope resulting in reduced amounts of atmospheric nitrogen and oxygen being introduced into the molten weld pool. In one embodiment, the core composition includes, by total weight of the metal-core weld wire, between approximately 0.05–0.20% Ti, and in another embodiment, between approximately 0.10–0.20% Ti. Amounts of titanium greater than 0.15% tend to increase slag formation on the weld deposit, which is undesirable because slag tends to trap vapor in the molten weld pool resulting in increased blow hole formation. Slag is also undesirable because it must be ultimately removed from the weld deposit in many applications, which increases costs. Reducing the amount of titanium below 0.10% has been found to increase spatter, decrease arc stability and reduce the weld deposit wetting characteristic.

In another embodiment, the core composition includes copper to prevent blow hole and pore formation and to reduce hot cracking. The presence of copper in the weld pool tends also to reduce liquid metal embrittlement by alloying with zinc to minimize zinc segregation to the grain boundaries of the weld deposit. In addition, copper in the metal-core weld wire results in formation of a protective barrier on the surface of the weld deposit, which improves corrosion resistance. In one embodiment, the core composition includes, by total weight of the metal-core weld wire, between approximately 0.02–1.00% Cu, and in another embodiment, between approximately 0.40–0.60% Cu. Reduction of copper tends to increase hot cracking and reduce corrosion resistance.

The metal-core weld wire of the present invention includes minimum amounts of silicon and manganese, which are primarily deoxidizing agents to reduce blow hole formation, minimize hot cracking, and to improve the wetting characteristic of the weld deposit. The metal-core weld wire includes in the sheath, or core composition, or both, by total weight of the metal-core weld wire, between approximately 0.1–1.0% Si, and in an alternative embodiment between approximately 0.4–0.5% Si. The metal-core weld wire also includes in the sheath, or core composition, or both, by total weight of the metal-core weld wire, between approximately 0.1–1.0% Mn, and in an alternative embodiment between 0.6 and 0.8% Mn. The core composition may also include iron powder as filler material.

In one embodiment, the metal-core weld wire includes, by total weight of the metal-core weld wire, less than 0.50% nickel, less than 0.50% chromium, less than 0.50% molybdenum, and less than 0.50% tungsten.

The core composition is, by total weight of the metal-core weld wire, between approximately 0.001–12.0%, and in an alternative embodiment between approximately 5.0 and 7.0%. The lower limit on the core composition is determined by the total weight percent of the core composition constituents. Generally, blow hole formation tends to increase as the core composition percentage increases. The weld deposit oxygen content is reduced significantly by reducing the oxygen content of the weld wire, which results among other advantages in increased impact strength of the weld deposit. The weld wire oxygen content is reduced by using a low oxygen iron powder in the core composition, or by reducing the amount of iron powder filler material in the core composition, or by baking the wire in an inert atmosphere as disclosed in copending U.S. Patent application Ser. No. 08/655,000, filed on 11 Jun. 1996, entitled "Metal-Core Weld Wire With Reduced Core Fill Percentage", assigned to the assignee of the present invention, and incorporated by reference herein.

The compositions of present invention are applicable to metal-core wires of any diameter, and in particular to wires diameters between approximately 0.076–0.157 cm (0.030–0.062 inches).

EXAMPLES

Table I illustrates metal-core wire compositions according to several exemplary embodiments of the present invention and related data on Blow Hole formation, Hot Cracking, ductility based on a U-Bend Test, and a Weldability Rating as discussed further below. A "—" entry in Table I indicates that data was not obtained for the particular test.

TABLE I

| TEST | C | SI | MN | TI | CR | NI | CU | NB | V | BLOW HOLES | HOT CRACKS | −60 F. U-BENDS | % CORE | RATING |
|---|---|---|---|---|---|---|---|---|---|---|---|---|---|---|
| 1 | .02 | .47 | .70 | .14 | 0 | 0 | .47 | .37 | 0 | 0 | 3/16" | PASS | 6.0 | 18 |
| 2 | 0 | .44 | .70 | .14 | 0 | 0 | .47 | .37 | 0 | 0 | — | PASS | 6.0 | 15 |
| 3 | .02 | .47 | .37 | .14 | 0 | 0 | .47 | .37 | 0 | 0 | 3/8" | PASS | 6.Q | 15 |
| 4 | 0 | .44 | .37 | .14 | 0 | 0 | .47 | .37 | 0 | 0 | .1875" | PASS, 1/16" | 6.0 | 14 |
| 5 | .09 | .47 | 1.0 | .14 | 0 | 0 | .47 | .37 | 0 | 1 | 4" | PASS | 6.0 | 13 |
| 6 | .02 | .47 | 1.0 | .14 | 0 | 0 | .47 | .37 | 0 | 0 | 2.25" | PASS | 6.0 | 14 |
| 7 | .09 | .47 | .70 | .14 | 0 | 0 | .47 | .18 | 0 | 3 | 5" | PASS | 6.0 | 10 |
| 8 | .02 | .47 | .70 | .14 | 0 | 0 | .47 | .18 | 0 | 1 | 1/8" | PASS | 6.Q | 11 |
| 9 | .02 | .47 | .70 | .14 | 0 | 0 | .47 | .73 | 0 | 2 | 6" | PASS | 6.0 | 12 |
| 10 | .09 | .47 | .70 | .30 | 0 | 0 | .47 | .37 | 0 | 0 | 1" | PASS | 6.0 | 15 |
| 11 | .02 | .47 | .70 | .30 | 0 | 0 | .47 | .37 | 0 | 0 | 1/8" | PASS | 6.0 | 13 |
| 12 | .09 | .47 | .70 | .41 | 0 | 0 | .47 | .37 | 0 | 0 | 1/2" | PASS, 3/32" | 6.0 | 14 |
| 13 | .02 | .47 | .70 | .14 | .30 | 0 | .47 | .37 | 0 | 0 | 1/2" | PASS | 6.0 | 15 |
| 14 | .02 | .47 | .70 | .14 | 0 | .30 | .47 | .37 | 0 | 0 | 5.5" | PASS | 6.0 | 11 |
| 15 | .09 | .47 | .70 | .14 | 0 | .30 | .47 | .37 | 0 | 1 | 6" | PASS | 6.0 | 13 |
| 16 | .09 | .47 | .70 | .14 | .30 | 0 | .47 | .37 | 0 | 4 | 2.25" | PASS | 6.0 | 13 |
| 17 | .09 | .47 | .70 | .14 | 0 | 0 | .47 | .37 | 0 | 0 | 1/2" | PASS | 6.0 | 14 |
| 18 | .09 | .47 | .70 | .14 | 0 | 0 | 0 | .37 | 0 | — | 10" | — | 6.0 | — |
| 19 | .09 | .47 | .68 | 0 | 0 | 0 | .47 | .37 | .37 | 6 | — | FAILED | 14.0 | 9 |
| 20 | .09 | .47 | .67 | .42 | 0 | 0 | .47 | .37 | .37 | 2 | — | FAILED | 14.0 | 14 |
| 21 AL 0.22% | .09 | .46 | .67 | .14 | 0 | .28 | .47 | 0 | 0 | 1 | 1/4" | PASS | 14.0 | 8 |
| 22 | .09 | .47 | .67 | .14 | 0 | 0 | .47 | .37 | 0 | 6 | — | PASS | 14.0 | 10 |

The Blow Hole data of Table I was determined on visual inspection after making a lap joint weld approximately 8.9 cm (3.5 inches) long on overlapping galvannealed steel plates 1.7 mm thick. The overlap was maintained at a minimum of approximately 0.64 cm (0.25 inches). The steel plates were welded with no gap therebetween by placing weights on the upper steel plate. FIG. 1 illustrates an overlapping plate arrangement with no gap. The welding operation was performed under the following conditions:

230–240 amperes;

24.4 volts;

0.045 wire with 1.90 cm (0.75 inches) electrode stick out (ESO);

100 cm/min minimum travel speed;

92% Ar/8% $CO_2$ shielding gas flowing at 40–45 ft$^3$ per hour;

20–27 degrees push angle.

Figure 2:
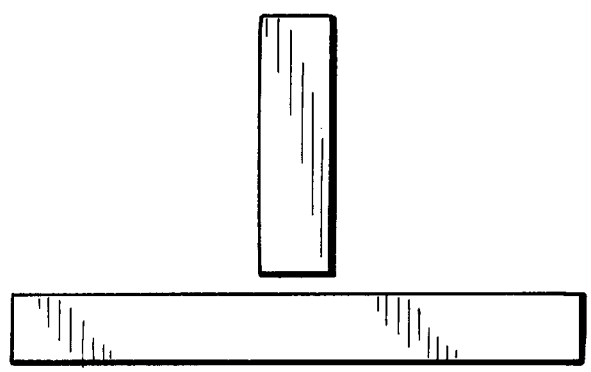
FIG. 2 is an end view of horizontal and vertical plates arranged in a T-configuration with a gap therebetween.

The Hot Cracks data of Table I was determined by measuring hot cracks after welding along both sides of a vertical plate initially tack welded to a horizontal plate in a T-configuration. FIG. 2 illustrates the horizontal and vertical plates, which were initially separated by a gap of at least approximately 0.20 cm (0.09 inches). The plates were approximately 0.60 cm (0.25 inches) thick, approximately 5.1 cm (2.00 inches) wide and approximately 25.4 cm (10.0 inches) long. The plate surfaces were sanded, and the plate composition included approximately

C 0.04%,

Mn 0.24%,

Si 0.001%, and

Al 0.07%.

The welding operation was performed under the following conditions:

220–240 amperes;

24 volts;

0.045 wire with 1.27–1.90 cm (0.25–0.75 inches) ESO;

40 cm/min minimum travel speed; and

92% Ar/8% $CO_2$ shielding gas flowing at 40–45 $ft^3$ per hour.

The foregoing Hot Cracks test is considered to be a severe welding test. A crack less than approximately 1.27 cm (0.5 inch) does not generally pose a problem in the majority of applications where these metal-core weld wires will be used. It is not expected that any of the exemplary metal-weld wire compositions of Table I will result in hot cracking when used to weld an unretrained lap joint on low carbon galvannealed steel. The unit of measure for the Hot Cracks data in Table I is inches.

The U-bend data of Table I was determined on visual inspection after making a lap weld along two overlapping galvannealed plates 1.7 mm thick, 5.1 cm (2 inches) wide and 20.32 cm (8 inches) long with no gap therebetween. The welded plates were then cut longitudinally to obtain a 5.1 cm (2 inch) wide strip with the lap weld disposed lengthwise approximately in the center of the strip. The welded strip was then pressed into a U bend about a 2.54 cm (1 inch) radius die at a temperature of −60 degrees F. The bend was formed along the length of the weld, which was on the outer circumference of the bent strip. Cracks greater than approximately 0.159 cm (0.062 inches) are indicated in units of inches.

The Weldability data of Table I was obtained by rating the following three categories 1.) "Spatter" 2.) "Weld Deposit Wetting" and 3.) "Arc Stability" on a scale of 0–6 and summing the ratings for each metal-core weld wire composition. The lowest rating is 0 and the highest rating is 6.

While the foregoing written description of the invention enables anyone skilled in the art to make and use what is at present considered to be the best mode of the invention, it will be appreciated and understood by those skilled in the art the existence of variations, combinations, modifications and equivalents within the spirit and scope of the specific exemplary embodiments disclosed herein. The present invention therefore is to be limited not by the specific exemplary embodiments disclosed herein but by all embodiments within the scope of the appended claims.

What is claimed is:

1. A metal-core weld wire usable for gas shielded arc welding low carbon and low alloy galvanized and galvanealed steels, the metal-core weld wire comprising:

a low carbon steel sheath; and a core composition surrounded by the low carbon steel sheath, the core composition including, by total weight of the metal-core weld wire, between approximately 0.05–0.20% Ti and between approximately 0.05–1.00% Nb, the core composition is, by total weight of the metal-core weld wire, between approximately 0.1–12.0%, wherein the weld wire provides, at weld rates up to 100 cm/min, reduced arc ionization potential and spatter, and improved arc stability and shielding, and wherein the weld wire produces, at weld rates up to 100 cm/min, weld deposits having reduced blow holes and porosity, and reduced weld pool surface tension resulting in an improved wetting characteristic.

2. The metal-core weld wire of claim 1 wherein the core composition includes, by total weight of the metal-core weld wire, between approximately 0.02–1.00% Cu.

3. The metal-core weld wire of claim 1 further comprising between approximately 0.10–1.0% Si and between approximately 0.10–1.0% Mn, wherein the low carbon steel sheath includes, by total weight of the metal-core weld wire, between approximately 0.01–0.03% C.

4. The metal-core weld wire of claim 1 wherein the core composition includes, by total weight of the metal-core weld wire, between approximately 0.05–0.80% V.

5. The metal-core weld wire of claim 1 further comprising between approximately 0.1–1.0% Si and between approximately 0.1–1.0% Mn, the low carbon steel sheath includes, by total weight of the metal-core weld wire, between approximately 0.01–0.03% C, and the core composition includes, by total weight of the metal-core weld wire, between approximately 0.30–0.40% Nb, between approximately 0.10–0.20 Ti, and Fe powder, wherein the core composition is, by total weight of the metal-core weld wire, between approximately 5.0–7.0%.

6. The metal-core weld wire of claim 5 wherein the core composition includes, by total weight of the metal-core weld wire, between approximately 0.40–0.60% Cu.

7. The metal-core weld wire of claim 6 wherein the core composition includes, by total weight of the metal-core weld wire, between approximately 0.05–0.20% V.

8. A metal-core weld wire usable for gas shielded arc welding low carbon and low alloy galvanized and galvanealed steels, the metal-core weld wire consisting essentially of:

a low carbon steel sheath; and a core composition surrounded by the low carbon steel sheath, the core composition including, by total weight of the metal-core weld wire, between approximately 0.30–0.40% Nb, between approximately 0.10–0.20% Ti, and Fe powder;

between approximately 0.1–1.0% Si, wherein the weld wire provides, at weld rates up to 100 cm/min, reduced arc ionization potential and spatter, and improved arc stability and shielding, and wherein the weld wire produces, at weld rates up to 100 cm/min, weld deposits having reduced blow holes and porosity, and reduced weld pool surface tension resulting in an improved wetting characteristic.

9. The metal-core weld wire of claim 8 further consisting essentially of between approximately 0.1–1.0% Mn, wherein the low carbon steel sheath includes, by total weight of the metal-core weld wire, between approximately 0.01–0.03% C.

10. The metal-core weld wire of claim 9 wherein the core composition includes, by total weight of the metal-core weld wire, between approximately 0.02–1.00% Cu.

11. The metal-core weld wire of claim 9 further consisting essentially of, by total weight of the metal-core weld wire, less than 0.50% Ni;

less than 0.50% Cr;

less than 0.50% Mo; and less than 0.50% W.

12. A metal-core weld wire usable for gas shielded arc welding low carbon and low alloy galvanized and galvanealed steels, the metal-core weld wire comprising:

a low carbon steel sheath; and a core composition surrounded by the low carbon steel sheath, the core composition including, by total weight of the metal-core weld wire, between approximately 0.05–0.20% Ti and between approximately 0.05–1.00% Nb, the core composition is, by total weight of the metal-core weld wire, between approximately 2.5–12.0%; and a trace amount of Ni, wherein the weld wire provides, at weld rates up to 100 cm/min, reduced arc ionization potential and spatter, and improved arc stability and shielding, and wherein the weld wire produces, at weld rates up to 100 cm/min, weld deposits having reduced blow holes and porosity, and reduced weld pool surface tension resulting in an improved wetting characteristic.

13. The metal-core weld wire of claim 12 wherein the core composition includes, by total weight of the metal-core weld wire, between approximately 0.02–1.00% Cu.

14. The metal-core weld wire of claim 12 further comprising between approximately 0.1–1.0% Si and between approximately 0.1–1.0% Mn, wherein the low carbon steel sheath includes, by total weight of the metal-core weld wire, between approximately 0.01–0.03% C.

15. The metal-core weld wire of claim 12 wherein the core composition includes, by total weight of the metal-core weld wire, between approximately 0.05–0.80% V.

16. The metal-core weld wire of claim 12 further comprising between approximately 0.1–1.0% Si and between approximately 0.1–1.0% Mn, the low carbon steel sheath includes, by total weight of the metal-core weld wire, between approximately 0.01–0.03% C, and the core composition includes, by total weight of the metal-core weld wire, between approximately 0.30–0.40% Nb, between approximately 0.10–0.20 Ti, and Fe powder, wherein the core composition is, by total weight of the metal-core weld wire, between approximately 5.0–7.0%.

17. The metal-core weld wire of claim 16 wherein the core composition includes, by total weight of the metal-core weld wire, between approximately 0.40–0.60% Cu.

* * * * *